United States Patent
Serizawa

(10) Patent No.: US 7,184,854 B2
(45) Date of Patent: Feb. 27, 2007

(54) DEVICE AND METHOD FOR GENERATING PISTON OUTLINE MACHINING DATA AND COMPUTER-READABLE RECORDING MEDIUM ON WHICH MACHINING DATA GENERATION PROGRAM IS RECORDED

(75) Inventor: Kazuaki Serizawa, Ichinomiya (JP)

(73) Assignee: Howa Machinery, Ltd., Aichi-Ken (JP)

( * ) Notice: Subject to any disclaimer, the term of this patent is extended or adjusted under 35 U.S.C. 154(b) by 227 days.

(21) Appl. No.: 10/520,899

(22) PCT Filed: Jul. 11, 2003

(86) PCT No.: PCT/JP03/08849

§ 371 (c)(1),
(2), (4) Date: Jan. 10, 2005

(87) PCT Pub. No.: WO2004/008262

PCT Pub. Date: Jan. 22, 2004

(65) Prior Publication Data
US 2005/0246050 A1    Nov. 3, 2005

(30) Foreign Application Priority Data
Jul. 16, 2002   (JP) .............................. 2002-206355

(51) Int. Cl.
G06F 19/00   (2006.01)

(52) U.S. Cl. ........................ 700/192; 700/184; 700/194
(58) Field of Classification Search ................ 700/159, 700/183, 184, 186, 190, 191, 192, 245, 251, 700/253, 262, 61, 64, 56, 58

See application file for complete search history.

(56) References Cited

U.S. PATENT DOCUMENTS 4,561,050 A * 12/1985 Iguchi et al. ................ 700/176

(Continued)

FOREIGN PATENT DOCUMENTS

JP    62-239557    10/1988

(Continued)

OTHER PUBLICATIONS

Patent Abstracts of Japan. No. 2001-52037 Filed: Feb. 23, 2001.

(Continued)

Primary Examiner—Thomas Pham
(74) Attorney, Agent, or Firm—Ladas & Parry LLP

(57) ABSTRACT

A machining data generator generates NC machining data specifying machining operations for shaping the external shape of a piston. The machining data generator uses a machining data sheet (provided by a spreadsheet software) describing noncircular part shape data on the shape of a noncircular part and condition data (machining condition data and shape data on shapes of parts other than the noncircular part necessary for shaping the overall shape of the piston). The machining data sheet is prepared beforehand. A machining data generation program reads the machining data sheet in step S4, recognizes directives "start cell" and "end cell" defining a cell region and described in the machining data sheet and fetches matrix data from the cell region in step S5, and fetches condition data other than the noncircular part shape data from the machining data sheet, and calculates NC machining data to be given to a NC machine tool on the basis of the condition data and the noncircular part shape data in step S6. Data management work for individually managing the noncircular part shape data and the other condition data is not necessary, those data can be collectively managed, and the relevant data can be collectively entered.

17 Claims, 9 Drawing Sheets

U.S. PATENT DOCUMENTS

| | | | | |
|---|---|---|---|---|
| 4,587,608 A | * | 5/1986 | Kishi et al. | 700/86 |
| 4,653,360 A | | 3/1987 | Compton | |
| 4,918,627 A | * | 4/1990 | Garcia et al. | 702/82 |
| 5,708,586 A | * | 1/1998 | Ikeda | 700/186 |
| 5,828,574 A | * | 10/1998 | Robinson et al. | 700/173 |
| 5,862,056 A | * | 1/1999 | Iwata et al. | 700/184 |
| 5,959,864 A | * | 9/1999 | Mori et al. | 700/159 |
| 6,125,304 A | * | 9/2000 | Suzuki | 700/182 |
| 6,356,800 B1 | * | 3/2002 | Monz et al. | 700/184 |
| 6,438,445 B1 | | 8/2002 | Yoshida et al. | |
| 6,519,860 B1 | * | 2/2003 | Bieg et al. | 33/503 |
| 6,539,274 B1 | * | 3/2003 | Rauth et al. | 700/159 |
| 6,597,968 B2 | * | 7/2003 | Matsumoto et al. | 700/188 |
| 6,668,466 B1 | * | 12/2003 | Bieg et al. | 33/503 |

FOREIGN PATENT DOCUMENTS

| | | | |
|---|---|---|---|
| JP | 05173621 A | * | 7/1993 |
| JP | 06-075814 | | 9/1994 |
| JP | 07-319528 | | 12/1995 |
| JP | 08-305434 | | 11/1996 |
| JP | 11-39014 | | 2/1999 |
| JP | 11-143514 | | 5/1999 |
| JP | 11143511 A | * | 5/1999 |
| JP | 11-224116 | | 8/1999 |
| JP | 11-231922 | | 8/1999 |
| JP | 2001-52037 | | 2/2001 |
| KR | 2000-0010931 | | 2/2000 |

OTHER PUBLICATIONS

Patent Abstracts of Japan No.: 11-39014 Filed: Feb. 12, 1999.
Patent Abstracts of Japan No.: 63-239557 Filed: Oct. 5, 1988.
Patent Abstracts of Japan No.: 11-143514 Filed: May 28, 1999.
Patent Abstracts of Japan No.: 11-224116 Filed Aug. 17, 1999.
Patent Abstracts of Japan of JP 07-319528 dated Dec. 8, 1995.
Patent Abstracts of Japan of JP 08-305434 dated Nov. 22, 1996.

* cited by examiner

| | A | B | C | D | E | F | G | H | I | J | K | L |
|---|---|---|---|---|---|---|---|---|---|---|---|---|
| 1 | | | START CELL | | | | | | | | | |
| 2 | START CELL | C5 | | | | | NONCIRCULAR PART SHAPE DATA | | | | | |
| 3 | END CELL | K45 | | | | | | | | | | |
| 4 | | | ANGLE / HEIGHT | 0 | | | $\theta i$ | ... 90 | ... | ... | 180 | |
| 5 | | | 40 | R(40,0) | R(40,5) | ... | | ... | ... | ... | R(40,180) | |
| 6 | DIRECTIVES | | ... | | | | | ... | ... | ... | ... | |
| . | | | $Zn$ | | | | $R(Zn,\theta i)$ | ... | ... | ... | ... | |
| . | | | ... | | | | | ... | ... | ... | ... | |
| 43 | | | 0 | R(0,0) | | | | | | | R(0,180) | |
| 44 | | | | | | | | | | | | |
| 45 | | | | | | | | | | | | ← END CELL |
| 46 | | | | | | | | | | | | |
| 47 | | | | | | | | | | | | |
| 48 | | C-AXIS ROTATING SPEED | | r1 | | MACHINING CONDITION | | | | | | |
| 49 | | Z-AXIS FEED SPEED | | V1 | | | | | | | | |
| 50 | | ... | | | | | | | | | | |
| 51 | | ... | | | | | | | | | | |
| 52 | | UNIT | | 0.001 | mm | OTHER SHAPE DATA | | | | | | |
| 53 | | DIAMETER OF THE LAND PART | | D1 | | | | | | | | |
| 54 | | LENGTH OF THE LAND PART | | L1 | | | | | | | | |
| 55 | | ... | | ... | | | | | | | | |
| 56 | | TOLERANCES FOR THE NONCIRCULAR PART | | ±d | | | | | | | | |

FIG. 2

DEVICE AND METHOD FOR GENERATING PISTON OUTLINE MACHINING DATA AND COMPUTER-READABLE RECORDING MEDIUM ON WHICH MACHINING DATA GENERATION PROGRAM IS RECORDED

TECHNICAL FIELD

The present invention relates to a NC machine tool for shaping a workpiece in a piston and, more particularly, to a machining data generator for generating machining data to be given to a NC machine tool, the machining data specifying machining operations for machining a workpiece in a desired external shape of a piston.

BACKGROUND ART

Referring to FIG. 9, a NC machine tool disclosed in JP-B 6-75814 for machining a workpiece W to shape a noncircular part, having an elliptic or noncircular cross section, of a piston holds the workpiece W on the spindle that rotates about an axis C, rotates the spindle, minutely controls the movement, for radial feed in directions along the Y-axis, of a tool H held on a tool holder of the NC machine tool in synchronism with the rotation of the spindle and moves the tool H for longitudinal feed in directions along the Z-axis.

The surface shape of the noncircular part of the piston is specified by matrix data designating the position of a point by a distance from the origin on the axis C of the spindle, namely, the Z axis, an angle about the axis C, and a radial distance on the Y-axis.

As shown in FIG. 9, a piston formed by machining the workpiece W has a land part A provided with ring grooves for receiving piston rings and a skirt part B continuous with the land A. A noncircular part having a noncircular cross section is included, in most cases, in the skirt part B. The edge of the skirt part B in directions along the Z axis, namely, the profile, is irregular. A NC machining data generator for generating machining data for controlling NC machining for forming such a surface shape is proposed in JP-A 7-319528.

The machining data generator mentioned in JP-A 7-319528 generates axial shape data and radial shape data by from numerical data specifying a polygon, and generates NC machining data by combining the axial shape data and the radial shape data. Shape data for controlling machining to form the noncircular part is given directly to the NC machining data generator by a keyboard, and data specifying machining conditions including the rotating speed of the workpiece about the axis C and longitudinal feed along the Z-axis for forming the noncircular part is given directly to the NC machining data generator by a keyboard.

The shape data and the machining data on machining conditions need to be given separately to the prior art machining data generator mentioned in JP-A 7-319528. Therefore, those data must be individually managed and require troublesome management work.

As mentioned above, the piston has the cylindrical land part A having the circular part with a circular cross section, and the skirt part B having the noncircular part with a noncircular cross section. An actual turning operation forms the land part A continuously with the skirt part B. Shape data needed for machining the land part A is given separately to the prior art machining data generator. Thus, those data are given separately by separate data input operations. When the data input operations are performed separately, errors are liable to be made in entering data, and entering or loading the same data again into the machining data generator is a very time-consuming job.

It is an object of the present invention to provide a machining data generator for generating machining data for shaping a piston by NC machining, capable of previously collecting shape data on a noncircular part of the piston, namely, matrix data, and other condition data necessary for forming the general external shape of the piston, such as machining condition data and additional shape data on parts other than the noncircular part, in a single machining data sheet, to save individually managing various data and to enter the relevant data collectively.

Another object of the present invention is to provide a machining data generator for generating machining data for shaping a piston by NC machining, capable of easily examining the appropriateness of shape data on a noncircular part of the piston and of intuitively correcting shape data on the noncircular part.

A third object of the present invention is to provide a machining data generator for generating machining data for shaping a piston by NC machining, capable of easily examining the appropriateness of generated NC machining data.

DISCLOSURE OF THE INVENTION

A machining data generator in a first aspect of the present invention for generating machining data for shaping an external shape of a piston includes: a noncircular part shape data fetching unit that reads a machining data sheet in which both noncircular part shape data for machining a noncircular part having a noncircular cross section of the piston and machining condition data are described and that fetches the noncircular part shape data from the machining data sheet; and a NC machining data calculating unit that recognizes the machining condition data described in the machining data sheet and that calculates NC machining data on the basis of the recognized machining condition data and the noncircular part shape data fetched by the noncircular part shape data fetching unit. Since the machining condition data is described together with the noncircular part shape data on the single machining data sheet, the data can be easily managed and all the data necessary for machining can be collectively obtained by reading the machining data sheet. Consequently, errors will not be made in entering data, and operations for entering the same data again and reloading the same data can be saved.

In the machining data generator in the first aspect of the present invention, it is preferable that additional shape data on a part other than the noncircular part is described in the machining data sheet, and the NC machining data calculating unit recognizes the additional shape data described in the machining data sheet together with the machining condition data and calculates NC machining data on the basis of the recognized machining condition data and the additional shape data, and the noncircular part shape data fetched by the noncircular part shape data fetching unit. Since the additional shape data, including the land part shape data, other than the noncircular part shape data is described together with the noncircular part shape data on the single machining data sheet, the data can be easily managed and all the data necessary for shaping the overall external shape of the piston can be collectively entered.

In the machining data generator in the first aspect of the present invention, it is preferable that the machining data sheet is a sheet provided by a spreadsheet software and the noncircular part shape data is described in the sheet of the spreadsheet software in a form of matrix data indicating coordinates for machining and arranged in rows and columns. Since the sheet provided by the general spreadsheet software is used as the machining data sheet for describing the noncircular part shape data, the noncircular part shape data can be easily produced and managed.

In the machining data generator in the first aspect of the present invention, it is preferable that the noncircular part shape data defines each of positions by an axial coordinate on the axis of a workpiece (a point on a Z-axis), an angular coordinate (an angle about a C-axis) and a radial coordinate (a point on a Y-axis), and the noncircular part shape data is described in the sheet of the spreadsheet software in a form of matrix data represented by axial coordinates and angular coordinates arranged in rows and columns. Since the noncircular part shape data defined by the axial coordinates, the angular coordinates and the radial coordinates is described in the matrix data represented by the axial coordinates and the angular coordinates arranged in rows and columns, the noncircular part shape data can be more easily and surely produced and managed and can be more easily and surely converted into the NC machining data.

In the machining data generator in the first aspect of the present invention, it is preferable that shape-data-describing-area-specifying data that specifies a cell region in which the matrix data is entered is described in the machining data sheet, and the noncircular part shape data fetching unit recognizes the cell region specified by the shape-data-describing-area-specifying data when the noncircular part shape data fetching unit reads the machining data sheet to fetch the noncircular part shape data from the cell region. Since the cell region specified by the shape-data-describing-area-specifying data is recognized and the noncircular part shape data entered in the recognized cell region is fetched, the noncircular part shape data arranged in the sheet of the spreadsheet software and other condition data can be read separately and the wrong application of the data can be effectively prevented.

It is preferable that the machining data generator in the first aspect of the present invention further includes a graphic display unit that graphically displays the noncircular part shape data. The graphic display unit facilitates the visual recognition of the shape of the noncircular part represented by the noncircular part shape data and hence the appropriateness of the noncircular part shape data can be easily examined.

Preferably, the graphic display unit includes an enlarging unit that displays a part of the graphically displayed noncircular part shape data in an enlarged picture. Thus, details of the shape of the noncircular part represented by the noncircular part shape data can be visually and precisely recognized and the appropriateness of the noncircular part shape data can be easily examined.

Preferably, the graphic display unit has a correcting unit that corrects the graphically displayed noncircular part shape data on a graphic display screen. Since the noncircular part shape data can be corrected by modifying a picture displayed on the graphic display screen without entering numerals, the noncircular part shape data can be intuitively corrected.

Preferably, the graphic display unit has a tolerance data display unit that graphically displays tolerance data on tolerances for the noncircular part shape data together with the noncircular part shape data. Since it is possible to visually verify whether or not differences of the corrected noncircular part shape data from reference noncircular part shape data are within the tolerances, the appropriateness of the corrected noncircular part shape data can be easily examined.

The machining data generator in the first aspect of the present invention may further include a simulation display unit that graphically displays a machining position (a position on the Y-axis and the like) and a machining speed (speed along the Y-axis) on a time axis as a reference axis on the basis of the NC machining data calculated by the NC machining data calculating unit. Thus, the appropriateness of machining positions (positions on the Y-axis and the like) and machining speed (speed along the Y-axis) from the start to the end of machining can be easily verified.

Preferably, the simulation display unit indicates a time indication line that moves along the time axis on the graphic display screen displaying the machining positions (positions on the Y-axis and the like) and the machining speed (speed along the y-axis), and displays information about the rotation of the spindle about the C-axis at a position indicated by the time indication line. Since the rotation information about the variation of the rotation of the spindle about the C-axis, the machining position (position on the Y-axis and the like) and the machining speed (speed along the Y-axis) with time from the start of machining, can be recognized on the graphic display screen, the appropriateness of those data can be easily verified.

A machining data generating method of generating machining data for shaping an external shape of a piston in a second aspect of the present invention includes: preparing a machining data sheet describing noncircular part shape data specifying machining operations for machining a noncircular part having a noncircular cross section of the piston together with machining condition data; reading the machining data sheet and fetching the noncircular part shape data from the machining data sheet; and recognizing the machining condition data described in the machining data sheet and calculating NC machining data on the basis of the recognized machining condition data and the fetched noncircular part shape data.

In the machining data generating method in the second aspect of the present invention, it is preferable that additional shape data on a part other than the noncircular part is described additionally in the machining data sheet, the additional shape data described in the machining data sheet is recognized together with the machining condition data, and the NC machining data is calculated on the basis of the recognized machining condition data and additional shape data, and the fetched noncircular part shape data.

A machining data generation program in a third aspect of the present invention specifying machining operations for shaping an external shape of a piston makes a computer execute: a procedure for reading a machining data sheet describing noncircular part shape data for machining a noncircular part having a noncircular cross section of the piston together with machining condition data and for fetching the noncircular part shape data from the machining data sheet; and a procedure for recognizing the machining condition data described in the machining data sheet and calculating NC machining data on the basis of the recognized machining condition data and the fetched noncircular part shape data. The machining data generation program may be recorded in a computer-readable recording medium from which a computer is able to read recorded information.

In the machining data generation program in the third aspect of the present invention, it is preferable that additional shape data on a part other than the noncircular part is described further in the machining data sheet, and the machining data generation program further executes a procedure for recognizing the additional shape data described in the machining data sheet, and calculating NC machining data on the basis of the recognized machining condition data and additional shape data, and the fetched noncircular part shape data.

In the machining data generating method in the second aspect of the present invention and the machining data generation program in the third aspect of the present invention, the machining condition data is described in combination with the noncircular part shape data in the single machining data sheet. Therefore, the data can be easily managed and various data can be collectively entered by reading the machining data sheet. Since the other shape data (shape data on the land part and the like) is described in addition to the machining condition data together with the noncircular part shape data in the single machining data sheet, the data can be easily managed and all the data necessary for shaping the overall external shape of the piston can be collectively entered.

BRIEF DESCRIPTION OF THE DRAWINGS

FIG. 2 is an example of a machining data sheet to be used by the machining data generator shown in FIG. 1;

BEST MODE FOR CARRYING OUT THE INVENTION

A machining data generator in a preferred embodiment of the present invention for generating machining data for shaping the external shape of a piston will be described with reference to FIGS. 1 to 9.

Figure 1:
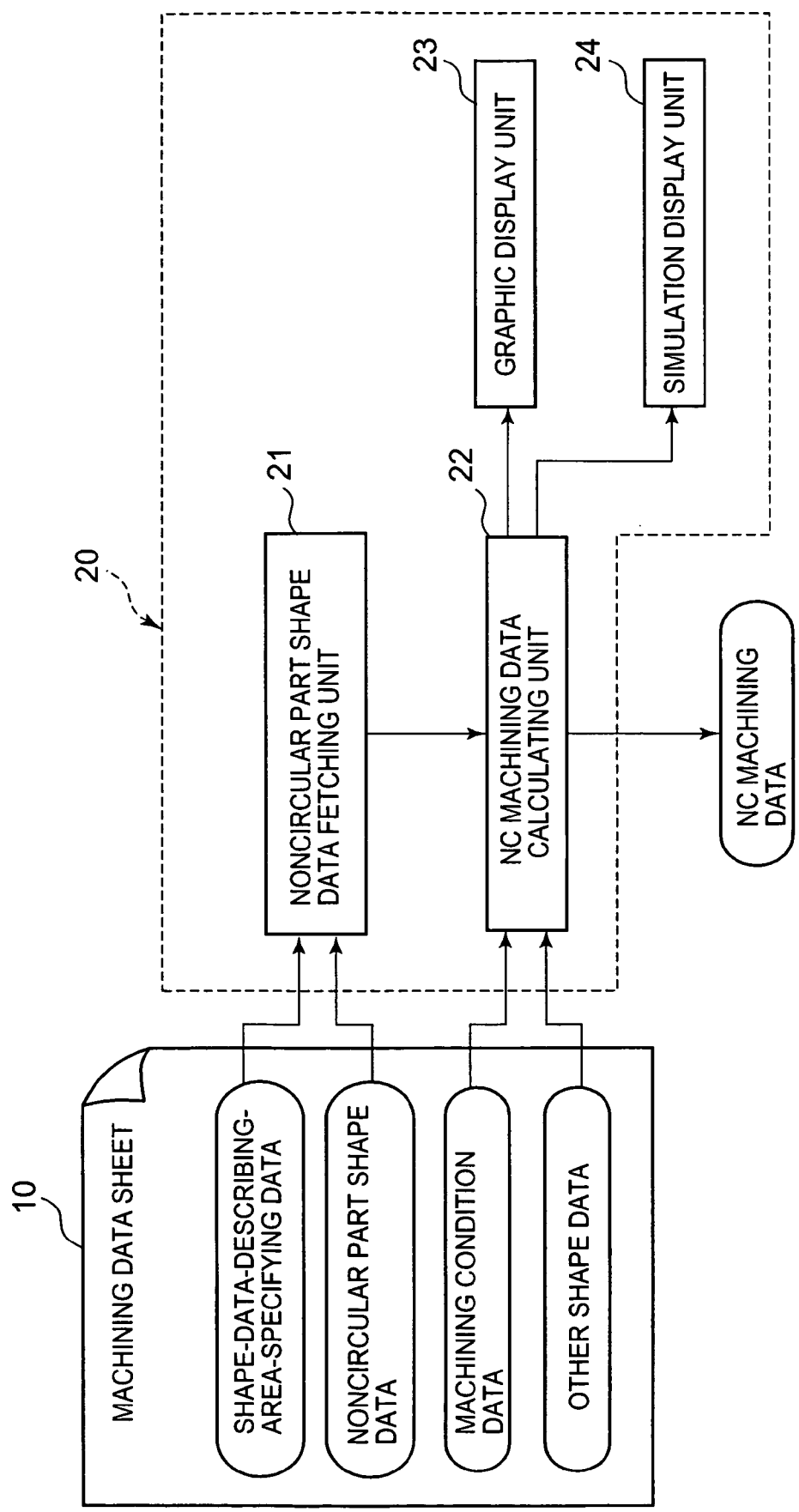
FIG. 1 is a functional block diagram of a machining data generator in a preferred embodiment of the present invention for generating machining data specifying machining operations for shaping the external shape of a piston.

Referring to FIG. 1, a machining data generator 20 in a preferred embodiment of the present invention has a noncircular part shape data fetching unit 21, a NC machining data calculating unit 22, a graphic display unit 23 and a simulation display unit 24.

Figure 8:
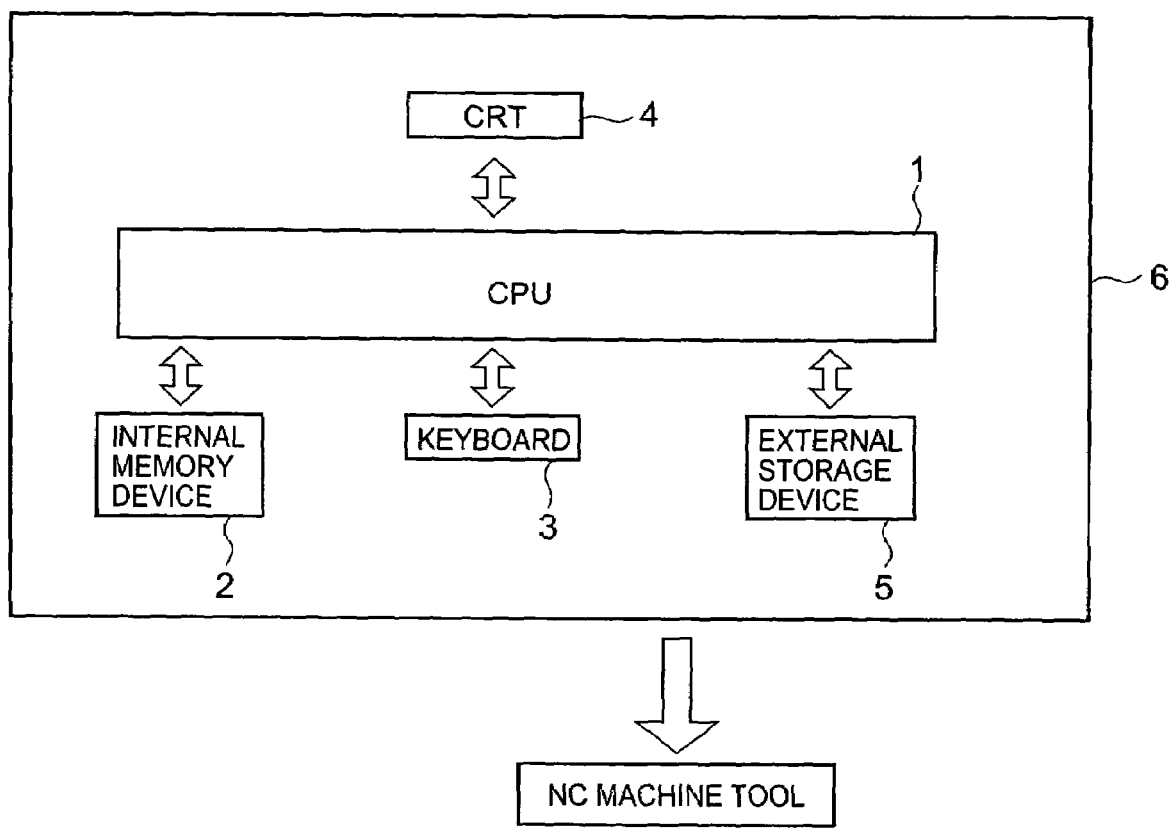
FIG. 8 is a view of a computer as hardware for realizing the machining data generator shown in FIG. 1.

Operations of the machining data generator 20 shown in FIG. 1 are carried out by executing a NC machining data generation program by a computer 6 shown in FIG. 8. The computer 6 shown in FIG. 8 has a CPU 1, an internal memory device 2, a keyboard 3, a CRT 4 and an external storage device 5. The NC machining data generation program is stored in the internal memory device 2. The CPU 1 of the computer 6 reads and executes sequentially instructions specified in the NC machining data generation program stored in the internal storage device 2 to carry out the following various functions. The NC machining data generation program may be stored in a computer-readable recording medium, such as a flexible disk or a CD-ROM.

The noncircular part shape data fetching unit 21 of the machining data generator 20 shown in FIG. 1 reads a machining data sheet 10 and fetches noncircular part shape data from the machining data sheet 10. The NC machining data calculating unit 22 recognizes other condition data other than the noncircular part shape data, namely, machining condition data and shape data on shapes of parts other than a noncircular part necessary for shaping the overall external shape of a piston, described in the machining data sheet 10. The NC machining data calculating unit 22 calculates NC machining data on the basis of the recognized other condition data (machining condition data and shape data on shapes of parts other than the noncircular part) and the noncircular part shape data fetched by the noncircular part shape data fetching unit 21. The graphic display unit 23 displays the noncircular part shape data graphically. The simulation display unit 24 displays machining positions and machining speeds on time axes as reference axes graphically.

The machining data sheet 10 is a sheet of a spreadsheet software made in advance, as shown in FIG. 2. The spreadsheet software is, for example, Excell® (Microsoft). The noncircular part shape data specifying conditions for shaping a noncircular part having a noncircular cross section is described in a cell region 11 of the machining data sheet 10.

Figure 4:
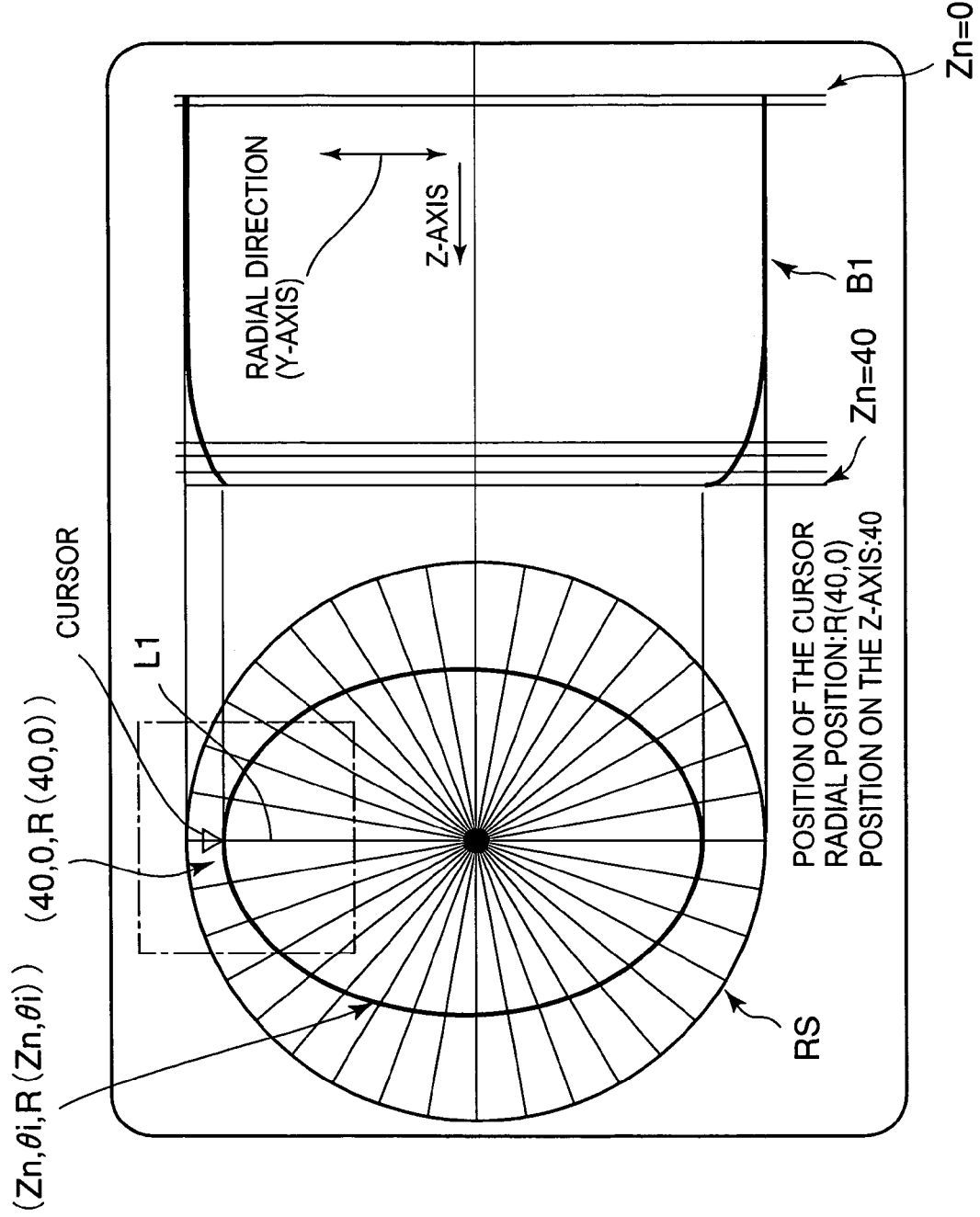
FIG. 4 is view of an example of a graphic display screen graphically displaying a noncircular part shape data.
Figure 9:
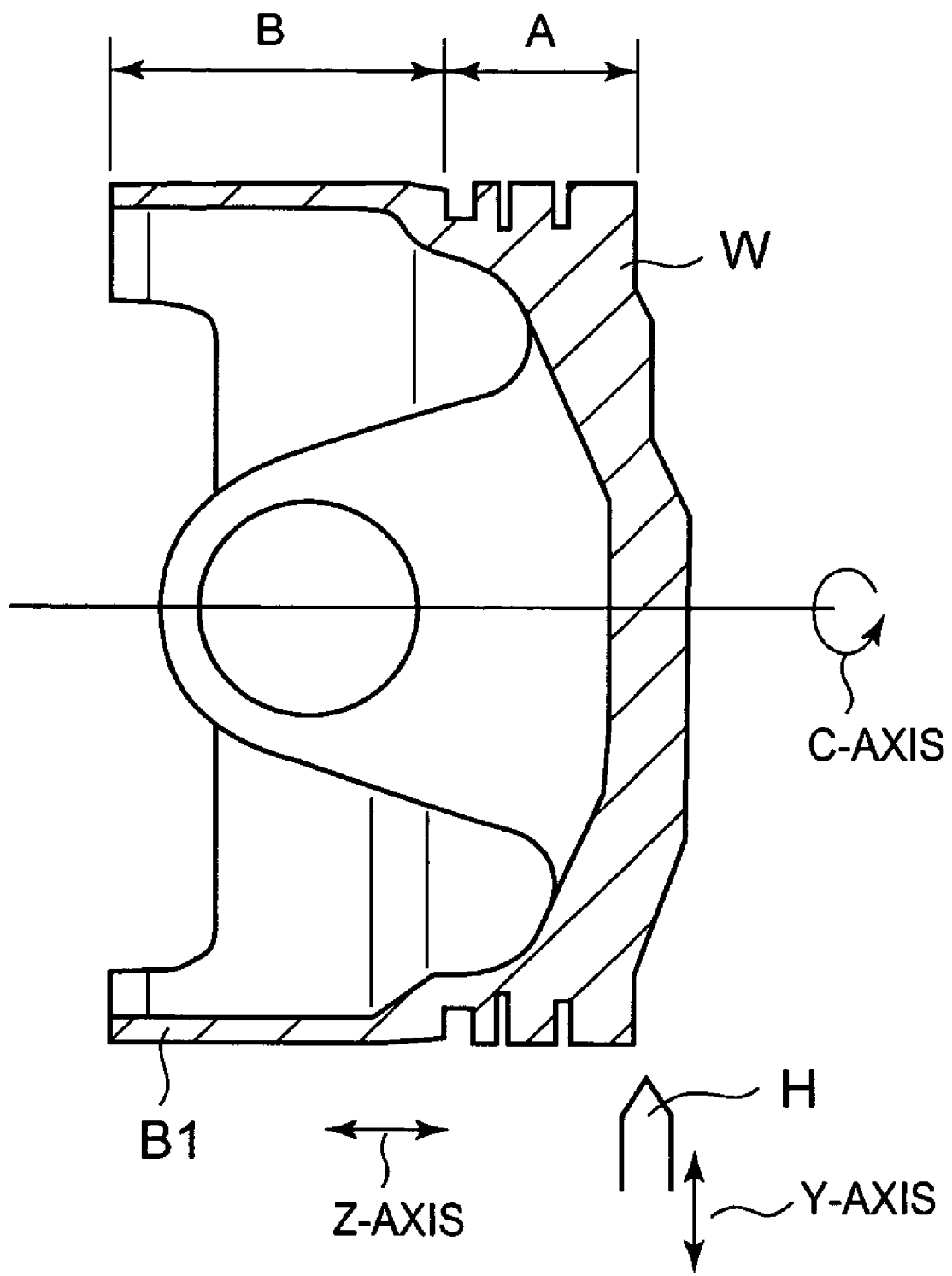
FIG. 9 is a schematic sectional view of an example of a piston to be formed by machining on the basis of NC machining data generated by the machining data generator shown in FIG. 1.

The noncircular part of the piston is, for example, a skirt part B shown in FIG. 9. As shown in FIG. 4, the external shape of the noncircular part is described by radial decrements of points from the radius of a reference circle RS, at fixed angular intervals of 5° on the outlines of cross sections taken on planes at fixed axial pitches of 1 mm along the Z-axis parallel to the height of a workpiece W. The height of the skirt part B is 40 mm by way of example.

In the machining data sheet 10 shown in FIG. 2, angles $\theta_i$ about the C-axis are arranged in rows, and positions $Z_n$ on the Z-axis are arranged in columns. Radial data R $(Z_n, \theta_i)$ are entered in cells at the intersections of the rows and the columns, respectively, in matrix data. Since the cross section of the noncircular part of the piston is symmetrical with respect to a center line as shown in FIG. 4, only the data on the points at angular positions between 0° and 180° is described.

The machining data sheet 10 has a head part including cells A2 and A3 named "start cell" and "end cell" as directives, respectively. Cell position data indicating the cell region 11, namely, shape-data-describing-area-specifying data, is entered in cells B2 and B3 adjacent to the cells A2 and A3. In the machining data sheet 10 shown in FIG. 2, "start position" is "C5" and "end position" is "K45". When the noncircular part shape data fetching unit 21 reads the machining data sheet 10, the noncircular part shape data fetching unit 21 recognizes the cell region 11, namely, a region between "C5" and "K45", specified by the cell position data (shape-data-describing-area-specifying data) described in the cells B2 and B3, and fetches the noncircular part shape data (matrix data) arranged in the specified cell region 11.

Other condition data necessary for shaping the overall external shape of the piston including machining condition data specifying tolerances for sizes of the noncircular part, units of the numerical values of the matrix data and machining conditions necessary for generating NC machining data, and shape data on shapes of parts other than the noncircular part, such as the diameter of the land part A are described after directives indicating the contents of the data in the machining data sheet 10. More concretely, a directive "C-axis rotating speed" indicates rotating speed about the C-axis. A rotating speed r1 is described in a cell on a row indicated by the directive "C-axis rotating speed". Other machining conditions are described in a similar manner.

Thus, all the data necessary for shaping the overall external shape of the piston is described collectively in the single machining data sheet 10. The machining data sheet 10 can be made in spare time. The noncircular part shape data and other condition data necessary for machining are held collectively in a single file. Thus, the data can be easily managed as compared with individually managing those data, and the various data necessary for machining can be collectively entered by reading the machining data sheet 10. Consequently, errors will not be made in entering data, and operations for entering the same data again and reloading the same data can be saved.

Figure 3:
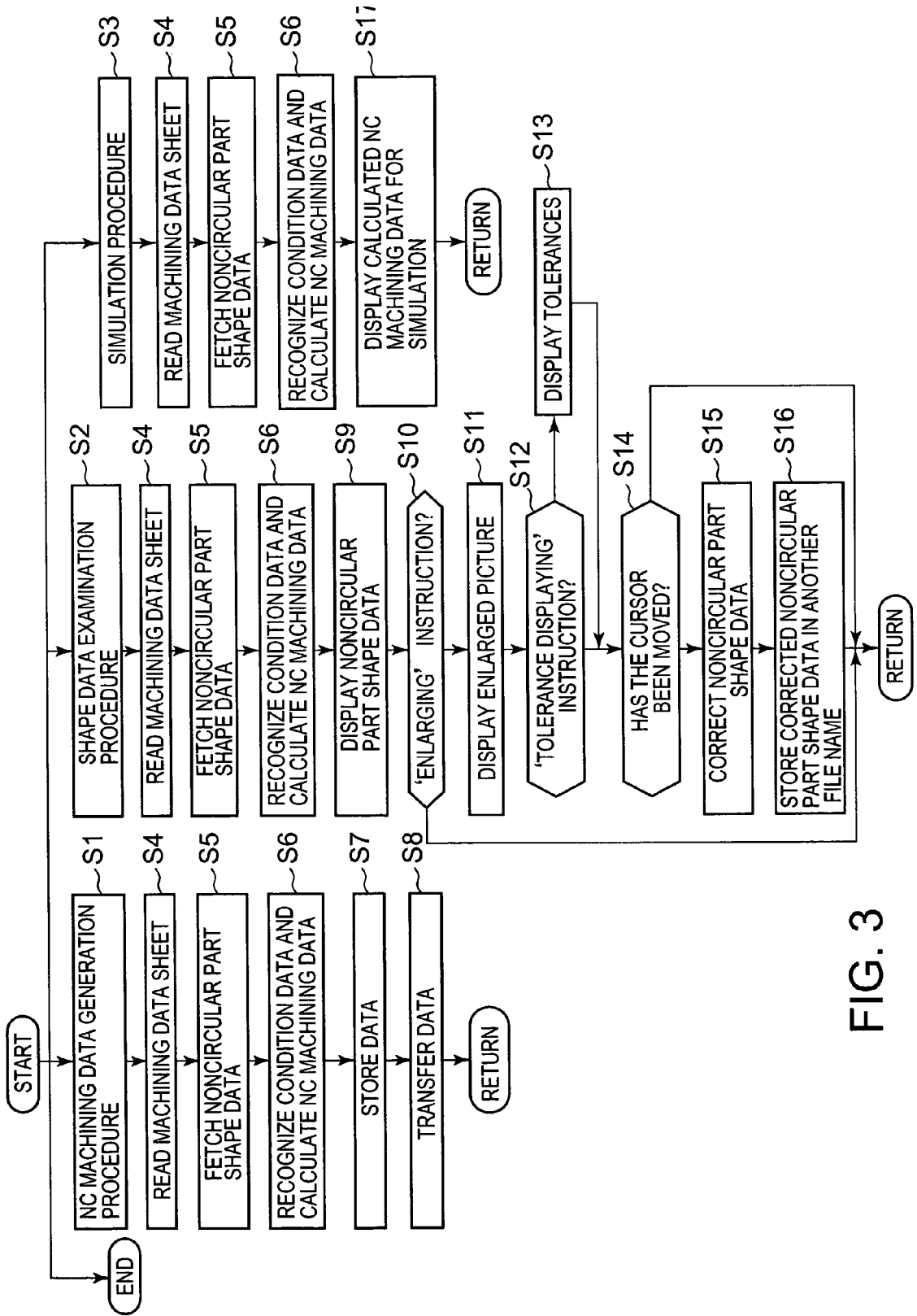
FIG. 3 is a flow chart of procedures of a NC data producing program realizing the machining data generator shown in FIG. 1.

A NC machining data generation program realizing the machining data generator 20 shown in FIG. 1 will be described with reference to FIG. 3. The NC machining data generation program includes three procedures, namely, a NC machining data generation procedure, a noncircular part shape data examination procedure and a NC machining data simulation procedure. The steps of those procedures included in the NC machining data generating program 20 constitute functional means.

(NC Machining Data Generation Procedure)

The NC machining data generation procedure will be explained.

The NC machining data generation program has step S1 instructing the NC machining data generator to start the NC machining data generation procedure. Then, the previously prepared machining data sheet 10 is read from the external storage device 5 or the internal memory device 2 of the computer 6 in step S4.

In step S5, a shape-data-describing-area-specifying data described in the machining data sheet 10 is recognized and the noncircular part shape data (matrix data) is fetched from the cell region specified by the shape-data-describing-area-specifying data (noncircular part shape data fetching means). For example, suppose that the machining data sheet 10 shown in FIG. 2 is given. Then, the directives "start cell" and "end cell" are recognized, and the noncircular part shape data (matrix data) arranged in the cell region 11 specified by the contents ("C5", "K45") of the cells B2 and B3 following the "start cell" and the "end cell" is read.

In step S6, directives specifying pieces of the condition data other than the noncircular part shape data are discriminated; numerical values given by the machining data sheet 10 are given to a NC machining data conversion program describing those directives as parameters; and NC machining data to be given to a NC machine tool is calculated on the basis of the other condition data and the noncircular part shape data obtained in step S5 (NC machining data calculating means).

The noncircular part shape data described in the machining data sheet 10 specifies the radial data on points at axial pitches of 1 mm along the Z-axis and angular intervals of 5° about the C-axis. When those data are converted into the NC machining data, machining conditions including longitudinal feed along the Z-axis and rotating speed about the C-axis are taken into consideration. Thus, the number of pieces of matrix data for controlling NC machining is far greater than that of pieces of data described in the machining data sheet 10. Naturally, data on points in the angular range of 0° to 360° about the C-axis is calculated. Since shape data for shaping the land part A of the piston is read also, longitudinal position data specifying the longitudinal positions of points with respect to the direction along the axis of the workpiece W, namely, the Z-axis, includes data specifying the positions of points in the length of the land part A along the Z-axis.

In step S7 subsequent to step S6, the calculated NC machining data is stored in predetermined places in the internal memory device 2 of the computer 6 (data storage command means), and then the NC machining data is transferred to the NC machine tool in step S8 (data transfer means).

(Noncircular Part shape Data Examination Procedure)

The noncircular part shape data examination procedure will be explained.

The noncircular part shape data examination procedure has step S2 instructing the NC machining data generator to start the noncircular part shape data examination procedure. Operations similar to those executed in steps S4, S5 and S6 of the NC machining data generation procedure are executed in steps S4, S5 and S6 following step S2.

In step S9 subsequent to step S6 of the noncircular part shape data examination procedure, the noncircular part shape data (matrix data) described in the machining data sheet 10 is displayed graphically on the screen of the CRT 4 of the computer 6 (graphic display means). A picture specified by the noncircular part shape data is displayed on the screen of the CRT 4 as shown in FIG. 4 in step S9. In FIG. 4, the external shape (profile) B1 of the entire noncircular part is displayed in a right half region of the screen of the CRT 4 of the computer 6, and a cross section of the external shape B1 in a plane at a specified position on the Z-axis is displayed in a left half region of the screen of the CRT 4.

When the cross section displayed in the left half region of the screen is turned at angular intervals specified in the machining data sheet 10 by operating the right move key and the left move key for moving the cursor of the keyboard 3 of the computer 6, the external shape B1 displayed in the right half region of the screen turns accordingly and an updated external shape of a cross section in a plane including a reference line L1 is displayed.

The Z-axis position on the Z axis of the cross section displayed in the left half region of the screen can be moved along the Z-axis at a pitch specified in the machining data sheet 10 and can be determined by operating the up key and the down key of the keyboard 3. FIG. 4 shows a shape at a Z-axis position Zn of 40 mm and an angular position $\theta_i$ of 0° about the X-axis.

Figure 5:
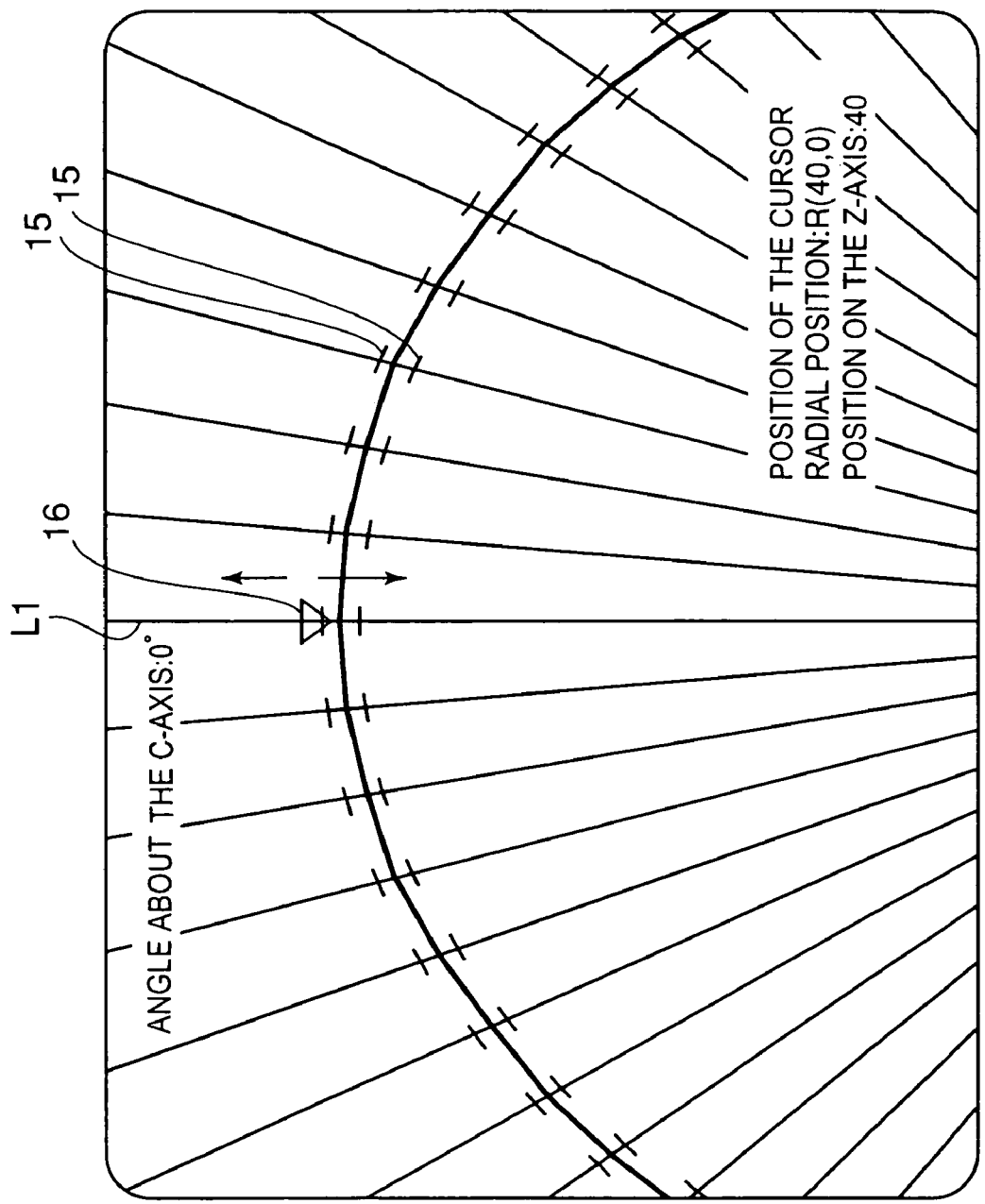
FIG. 5 is a view of the graphic display screen graphically displaying a part of the noncircular part shape data shown in FIG. 4 in an enlarged picture.

A part of the noncircular part shape data graphically displayed on the screen can be displayed in an enlarged picture. An instruction requesting enlarging a desired rectangular area is given by specifying a corner of the rectangular area and another corner diagonally opposed to the former corner by operating a mouse. then, a part of the noncircular part shape data corresponding to the desired rectangular area can be enlarged in proportion to the size of the screen as shown in FIG. 5 in step S11 (picture enlarging means). Since the part of the noncircular part shape data is graphically displayed in an enlarged picture, details of the shape of a part of the noncircular part specified by the selected part of the noncircular part shape data can be surely recognized through visual observation.

Tolerance data specifying tolerances for the noncircular part specified by the noncircular part shape data can be graphically displayed together with the noncircular part shape data. When a tolerance display instruction is given by operating the keyboard 3 or the mouse in step S12, short lines as tolerance marks 15 indicating tolerances for the noncircular parts described in the machining data sheet 10 are displayed at predetermined angular pitches of, for example, 5° as shown in FIG. 5 (tolerance data display means). When the noncircular part shape data is corrected in steps S14 and S15, the graphical display of the tolerance data for the noncircular part together with the noncircular part shape data (sectional shape data) facilitates the visual verification of whether or not the differences of corrected noncircular part shape data from the reference noncircular part shape data are within the tolerances.

The noncircular part shape data graphically displayed on the screen can be corrected by operating the pictures displayed on the screen. As shown in FIG. 5, a correction cursor 16 indicating a curve representing the profile of a cross section is displayed on the reference line L1. The cursor 16 can be vertically moved by operating two appropriate keys of the keyboard 3, such as a key A and a key S. When it is decided in step S14 that the cursor 16 has been vertically moved, relevant data among the noncircular part shape data (matrix data) described in the machining data sheet 10 is corrected in step S15 (correcting means). The thus corrected noncircular part shape data is stored in a machining data sheet of a file name different from that of the read machining data sheet 10 in step S16. Since the noncircular part shape data is corrected by operating the picture graphically displayed on the screen, the intuitive correction of the noncircular part shape data is possible. Since the part of the noncircular part shape data graphically displayed in an enlarged picture, details of the shape of the noncircular part can be surely and visually recognized.

Although this noncircular part shape data examination procedure calculates the NC machining data in step S6, the results of calculation do not need necessarily to be used in steps S9 to S16.

(NC Machining Data Simulation Procedure)

The NC machining data simulation procedure will be explained.

The NC machining data generation program has step S3 instructing the NC machining data generator to start the NC machining data simulation procedure. Operations similar to those executed in steps S4, S5 and S6 of the NC machining data generation procedure are executed in steps S4, S5 and S6 following step S3.

In step S17 subsequent to step S6 of the NC machining data simulation procedure, the NC machining data calculated in step S6 is displayed graphically on the screen of the CRT 4 of the computer 6 (simulation display means).

Figure 6:
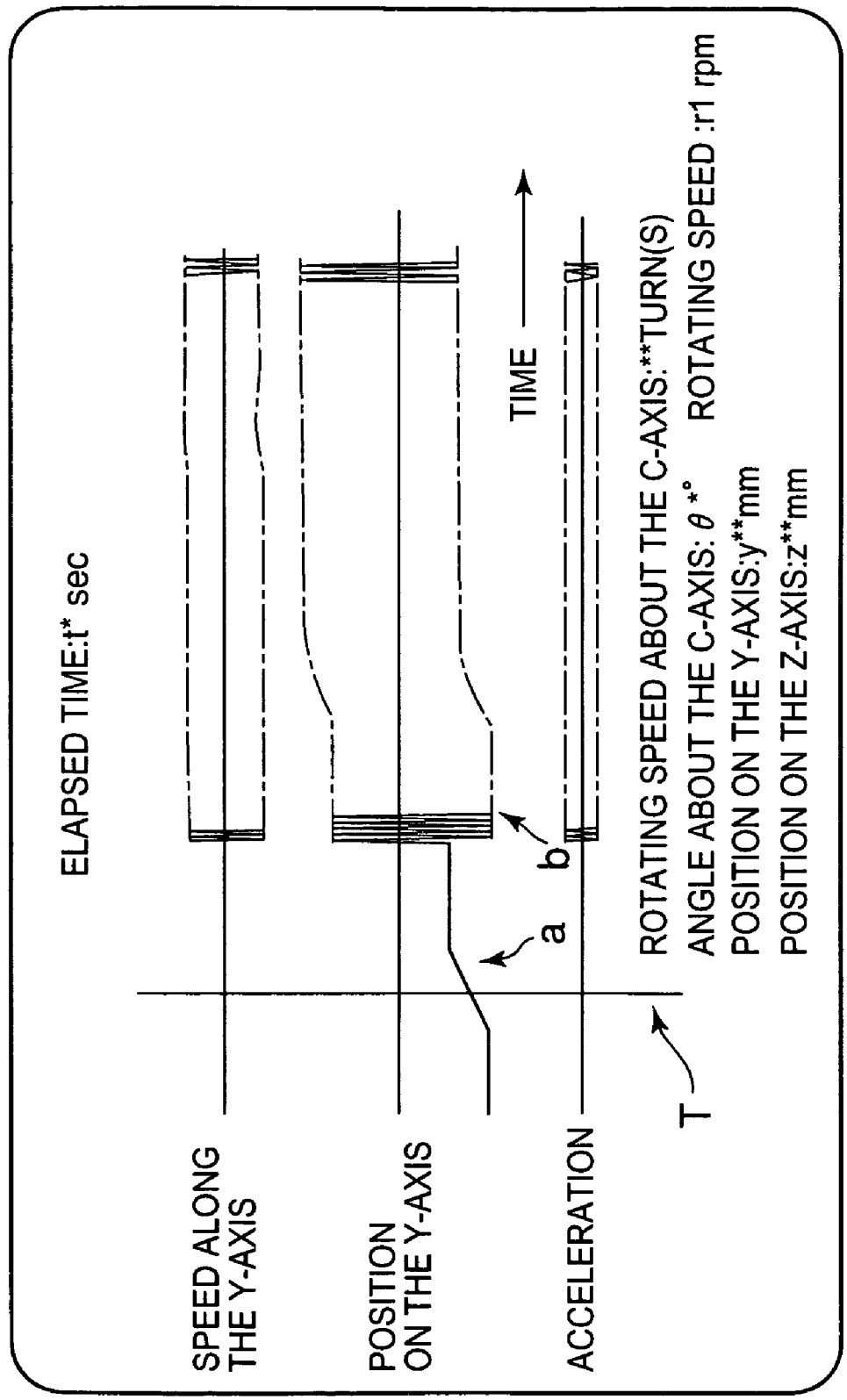
FIG. 6 is a view of a graphic display screen (simulation screen) displaying an example of a picture showing the result of simulation (positions on the Y-axis and speeds along the Y-axis) on time axes as reference axes.

The NC machining data is displayed graphically on the screen of the CRT 4 in step S17 in a simulation picture as shown in FIG. 6 (simulation picture). In the simulation picture shown in FIG. 6, time is measured on a horizontal time axis, and the machining position (radial position on the Y-axis) of the tool H after a time elapsed after the start of a machining operation calculated on the basis of the longitudinal feed speed in a direction parallel to the Z-axis and the speed and acceleration of the tool H with respect to a direction parallel to the Y-axis are displayed graphically.

Also shown in the simulation picture are information about the rotation of the work W about the C-axis including the rotating speed of the work W about the C-axis during NC machining, an angle about the C-axis and the number of turns of the work W after the start of the machining operation, the position of the tool H on the Z-axis and information relating with the Y-axis (the position on the Y-axis of the tool H with respect to a datum point on the lathe, and incidental Y-axis information).

A vertical time indicating line T displayed on the screen can be laterally moved along the time axis by operating the right move key and the left move key for controlling the cursor of the keyboard 3. The position of the time indicating line T on the time axis indicates time elapsed after the start of machining. The elapsed time is displayed in an upper part of the screen, and information about the rotation of the work W about the C-axis and a position on the Z-axis at the end of the elapsed time displayed in the upper part of the screen is displayed in a lower part of the screen.

In the simulation picture shown in FIG. 6, the time axis is compressed to display all the machining operations for producing a piston. In a simple section a indicating machining operations for forming the land part A, the position of the tool H is on a fixed line fixed with respect to directions along the Y-axis, signifying that a machining operations for cylindrical turning is being performed. In a complicated section b indicating machining operation for forming the skirt part B, the position of the tool H changes in opposite directions along the Y-axis at a high frequency, signifying that a machining operation for noncircular turning is being performed.

Figure 7:
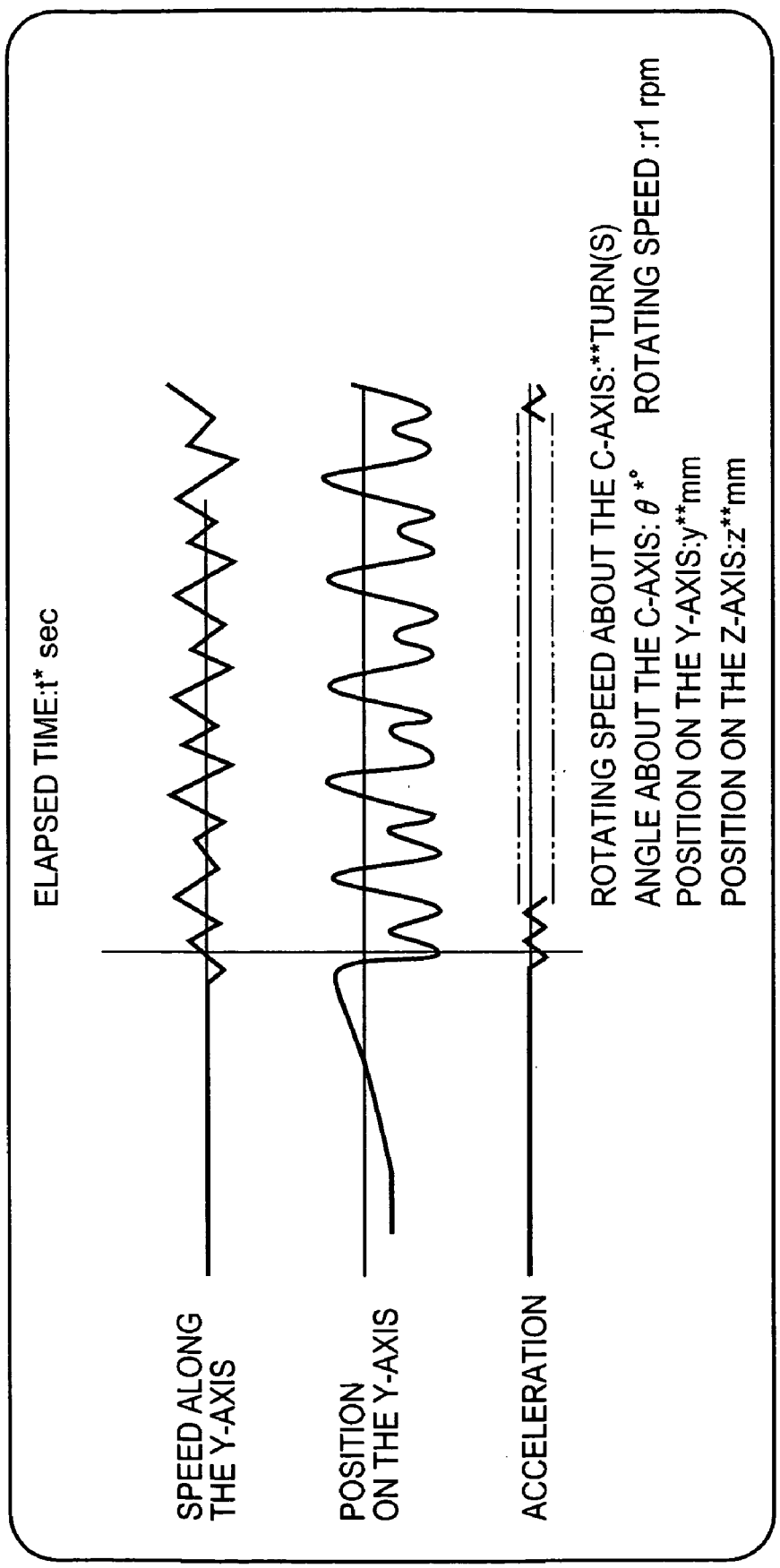
FIG. 7 is a view of the graphic display screen (simulation screen) displaying an example of a picture showing a part of the result of simulation on expanded time axes.

A part of the simulation picture, similarly to the graphic picture shown in FIG. 4, can be displayed in an enlarged picture. FIG. 7 shows an enlarged picture illustrating a transient stage of machining where a machining operation for forming the land part A is completed and a machining operation for forming the skirt part B is started (enlarged display means).

Thus, the appropriateness of the generated NC machining data (appropriateness of the movement of the tool with respect to the Y-axis) can be easily visually verified through the examination of the calculated NC machining data calculated in step S6 and graphically displayed on the screen in the simulation picture.

The invention claimed is:

1. A machining data generator for generating machining data for shaping an external shape of a piston, said machining data generator comprising:

a spreadsheet software unit that describes noncircular part shape data defined by a longitudinal coordinate on an axis of a workpiece, an angular coordinate corresponding to the longitudinal coordinate, and a radial coordinate corresponding to the angular coordinate in a form of matrix data in a machining data sheet, and describes shape-data-describing-are-specifying data that specifies a cell region in which the matrix data is entered, and machining condition data that specifies machining conditions for shaping the noncircular part of the piston, after directives in the machining data sheet;

a noncircular part shape data fetching unit that recognizes the cell region specified by the shape-data-describing-area-specifying data in reading the machining data sheet and fetching the noncircular part shape data; and a NC machining data calculating unit that recognizes the machining condition data described in the machining data sheet and that calculates NC machining data on the basis of the recognized machining condition data and the noncircular part shape data fetched by the noncircular part shape data fetching unit.

2. The machining data generator according to claim 1, wherein additional shape data on a part other than the noncircular part is described in the machining data sheet, and the NC machining data calculating unit recognizes the additional shape data described in the machining data sheet together with the machining condition data and calculates NC machining data on the basis of the recognized machining condition data and the additional shape data, and the noncircular part shape data fetched by the noncircular part shape data fetching unit.

3. The machining data generator according to claim 1, further comprising a graphic display unit that graphically displays the noncircular part shape data in a picture of a cross section of the noncircular part at a specified axial position, and a picture of an outline of the noncircular part cut along a reference longitudinal line in the picture of the cross section, placed beside the picture of the cross section, wherein the axial position of the cross section can be specified.

4. The machining data generator according to claim 3, wherein the graphic display unit includes an enlarging unit that displays a part of the graphically displayed noncircular part shape data in an enlarged picture.

5. The machining data generator according to claim 3, wherein the graphic display unit has a correcting unit that corrects the graphically displayed noncircular part shape data on a graphic display screen.

6. The machining data generator according to claim 3, wherein the graphic display unit has a tolerance data display unit that graphically displays tolerance data on tolerances for the noncircular part shape data together with the noncircular part shape data.

7. The machining data generator according to claim 3, wherein the graphic display unit is adapted to turn a cross section of the noncircular part at a specified longitudinal position at a predetermined angular interval.

8. The machining data generator according to claim 1, further comprising a simulation display unit that graphically displays a machining position and a machining speed of a tool on a time axis as a reference axis on the basis of the NC machining data calculated by the NC machining data calculating unit.

9. The machining data generator according to claim 8, wherein the simulation display unit indicates a time indication line that moves along the time axis on the graphic display screen displaying the machining position and machining speed of the tool, and displays information about a rotation of the spindle at a position indicated by the time indication line.

10. The machining data generator according to claim 2, further comprising a graphic display unit that graphically displays the noncircular part shape data in a picture of a cross section of the noncircular part at a specified axial position, and a picture of an outline of the noncircular part cut along a reference longitudinal line in the picture of the cross section, placed beside the picture of the cross section, wherein the axial position of the cross section can be specified.

11. The machining data generator according to claim 4, wherein the graphic display unit has a correcting unit that corrects the graphically displayed noncircular part shape data on a graphic display screen.

12. The machining data generator according to claim 4, wherein the graphic display unit has a tolerance data display unit that graphically displays tolerance data on tolerances for the noncircular part shape data together with the noncircular part shape data.

13. The machining data generator according to claim 5, wherein the graphic display unit has a tolerance data display unit that graphically displays tolerance data on tolerances for the noncircular part shape data together with the noncircular part shape data.

14. A machining data generating method of generating machining data for shaping an external shape of a piston, said method comprising:

preparing a machining data sheet of a spreadsheet software for NC machining data calculation by describing noncircular part shape data specifying a noncircular part of the piston in a form of matrix data defined by a longitudinal coordinate on an axis of a workpiece, an angular coordinate corresponding to the longitudinal coordinate and a radial coordinate corresponding to the angular coordinate, and by describing shape-data-describing-area-specifying data that specifies a cell region in which the matrix data is entered, and machining condition data that specifies machining conditions for shaping the noncircular part of the piston, after directives in the machining data sheet;

recognizing the cell region specified by the shape-data-describing-area-specifying data when reading the machining data sheet and fetching the noncircular part shape data from the cell region; and recognizing the machining condition data described in the machining data sheet and calculating NC machining data on the basis of the recognized machining condition data and the fetched noncircular part shape data.

15. The machining data generating method according to claim 14, wherein additional shape data on a part other than the noncircular part is described additionally in the machining data sheet, the additional shape data described in the machining data sheet is recognized together with the machining condition data, and the NC machining data is calculated on the basis of the recognized machining condition data and additional shape data, and the fetched noncircular part shape data.

16. A computer-readable recording medium storing a machining data generation program for generating machining data on machining operations for shaping an external shape of a piston, to be executed by a computer, characterized in that the machining data generating program executes:

a procedure for preparing a machining data sheet spreadsheet software for NC machining data calculation by describing noncircular part shape data specifying a noncircular part of the piston in a form of matrix data defined by a longitudinal coordinate on an axis of a workpiece, an angular coordinate corresponding to the longitudinal coordinate and a radical coordinate corresponding to the angular coordinate, and by describing shape-data-describing-area-specifying data that specifies a cell region in which the matrix data is entered, and machining condition data that specifies machining conditions for shaping the noncircular part of the piston, after directives in the machining data sheet;

a procedure for recognizing the cell region specified by the shape-data-describing-area-specifying data when reading the machining data sheet and fetching the noncircular part shape data from the cell region; and a procedure for recognizing the machining condition data described in the machining data sheet and calculating NC machining data on the basis of the recognized machining condition data and the fetched noncircular part shape data.

17. The recording medium according to claim 16, wherein additional shape data on a part other than the noncircular part is described in the machining data sheet, and the machining data generating program further executes a procedure for recognizing the additional shape data described in the machining data sheet and the machining condition data and calculating NC machining data on the basis of the recognized machining condition data and additional shape data, and the fetched noncircular part shape data.

* * * * *